June 5, 1934.  F. SCHMIDT  1,962,097
VALVE
Filed July 26, 1930
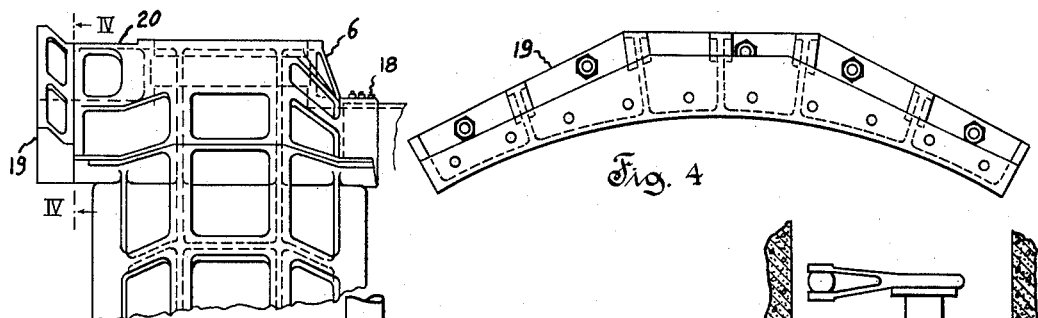
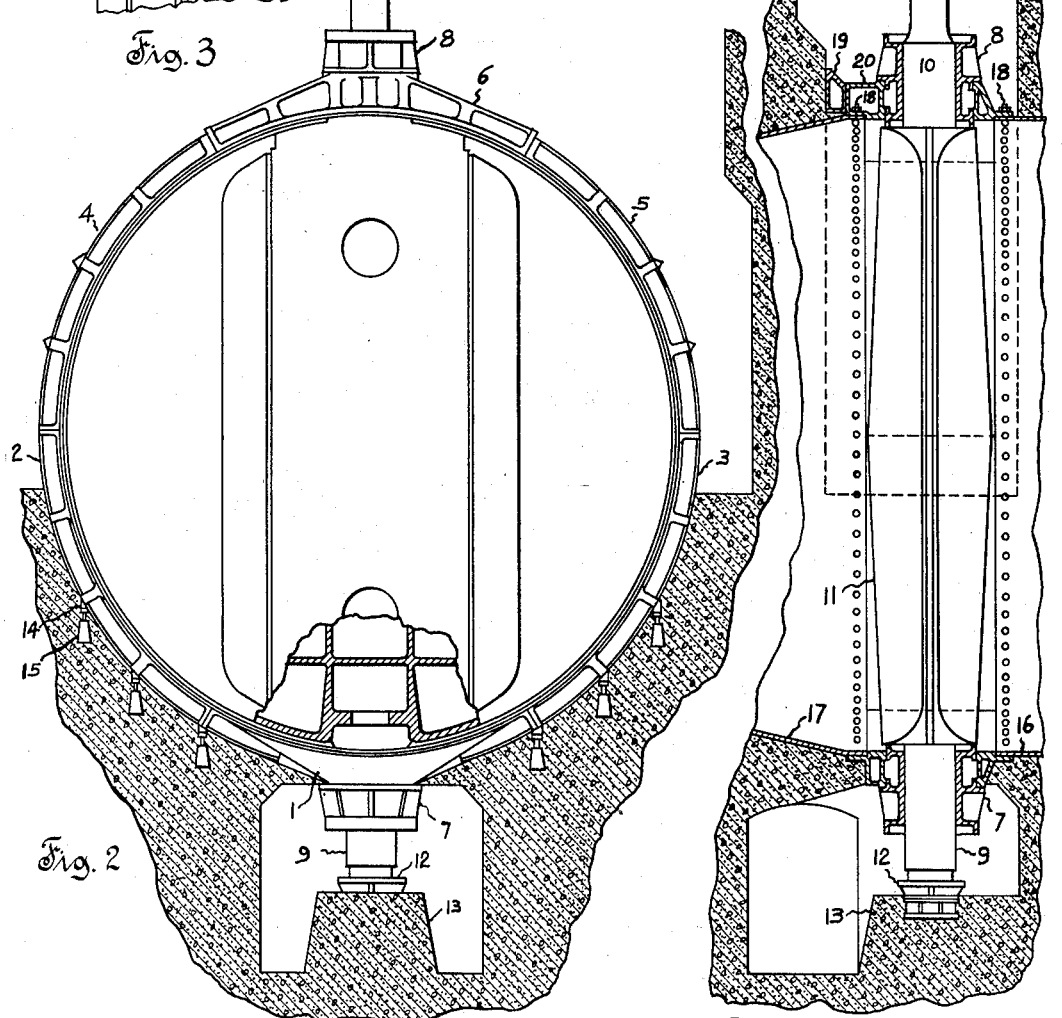
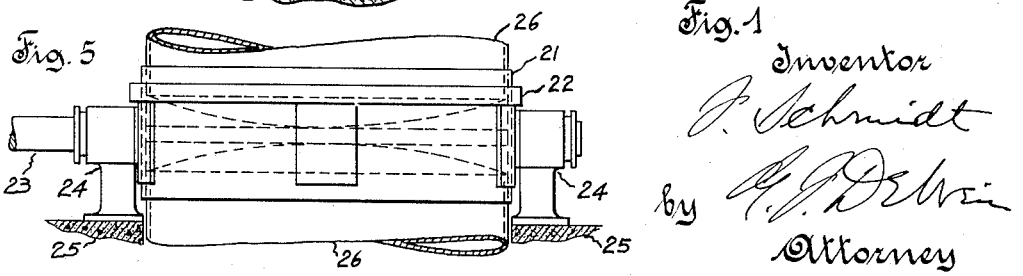
Inventor
F. Schmidt
by
Attorney Patented June 5, 1934

1,962,097

UNITED STATES PATENT OFFICE 1,962,097

VALVE

Franz Schmidt, Wauwatosa, Wis., assignor to Allis-Chalmers Manufacturing Company, Milwaukee, Wis., a corporation of Delaware Application July 26, 1930, Serial No. 470,907

8 Claims. (Cl. 251—11)

This invention relates to improvements in the construction of valve devices and especially to improvements of butterfly valves, whereby a better adaptation of such valves to their operating conditions may be obtained especially when they are utilized in penstocks of considerable diameter, for instance in penstocks of water power plants or similar installations.

In a butterfly valve of conventional design the entire load of the water pressing against the wicket in its closed position is practically concentrated on the wicket shaft, and the valve housing in which this shaft is journaled is subject, therefore, to a thrust which is substantially concentrated in two diametrically opposed points and tends to move the housing in axial direction. To meet these unfavorable load conditions it has, heretofore, been necessary to make the valve housing strong enough to withstand the stresses caused by the concentrated forces in the bearings, and it is obvious that, with such prior art structure, in cases where the valve diameter is large, a relatively heavy and costly construction would be required. It is an object of the invention to provide means whereby the concentrated thrust forces acting upon the bearings are prevented from causing undue stresses in the housing so that the latter can be made lighter and cheaper than has heretofore been possible. Preferably, these means are so arranged that they offer a rigid support for those parts of the valve housing which carry the bearings for the wicket, and any thrust forces acting in the direction of the housing axis are directly transmitted to said supporting means. These forces may place the supporting means either in tension or compression depending on the direction of flow of water or the location of the supporting means with reference to the valve. Furthermore, the housings of large butterfly valves are, generally, so constructed that a part of the housing can be removed in order to take out the wicket, and the invention contemplates the provision of means whereby not only the stationary parts but also the removable parts of such valve housings are rigidly supported, so that any axial thrust resulting from the load of the water pressing against the wicket is taken up by said means without causing undue stresses in the housing and its adjacent penstock.

An application of R. H. Earle, Serial Number 470,896 filed contemporaneously herewith, discloses a butterfly valve in which a particular construction of the housing calls for the provision of means whereby the entire housing is substantially relieved from thrust forces acting in the direction of the housing axis. This result can be obtained by a modification of the present invention in which separate bearings for the wicket shaft are mounted outside and independently of the housing.

A clear conception of the invention may be had by referring to the drawing in which like reference characters designate the same parts in the various views.

Fig. 1 is a section through a butterfly valve embodying the invention, the wicket being shown in elevation.

Fig. 2 is an elevation of Fig. 1, the penstock portions in front of the valve being broken away.

Fig. 3 is a side elevation of the upper part of the valve housing.

Fig. 4 is a detail view on line IV—IV of Fig. 3, showing the thrust plate which is bolted to the foundation.

Fig. 5 shows a top view of a modified construction embodying the invention.

The butterfly valve shown in Figs. 1 and 2 comprises a cast steel housing and a cast steel wicket rotatable within the housing about a vertical axis. The housing is made in six sections 1 to 6 which are joined together in a suitable manner, preferably by bolts. The lower section 1 and the upper section 6 have openings in which bearings 7 and 8 are mounted to support journals 9 and 10 which are formed on the wicket 11 in diametrically opposed disposition. A thrust bearing 12 is mounted on the concrete foundation 13 outside of the housing and adapted to take up the vertical load of the wicket. The lateral sections 2 and 3 at the lower half of the housing are substantially alike and have lugs 14 adapted to rest on supporting blocks 15 which are embedded in the foundation. The lateral sections 4 and 5 at the upper half of the housing correspond substantially to the sections 2 and 3 at the lower half and are interchangeable with them. 16 indicates the wall of the pipe line which is connected to the inlet side of the valve housing, and 17 indicates the wall of the pipe line connected to the outlet side. The connections are preferably made by bolting the pipe line to the valve housing as indicated at 18. If it is desired to remove the wicket from the valve housing the upper sections 4, 5 and 6 are disconnected from the pipe line and removed, whereupon the wicket can be lifted out of the lower half of the housing.

The lower sections 1, 2 and 3 are embedded into the concrete foundation and rigidly held therein. The upper section 6 is somewhat different from the corresponding lower section 1 as it is adapted to bear against a beam element in the form of a segment 19 which is secured to the concrete foundation. An extension 20 formed on the upper housing section 6 has a flat vertical surface in contact with a corresponding surface on the supporting segment 19 and suitable means, preferably bolts, are provided to hold both parts together.

It will be apparent that in the described arrangement the valve housing is relieved from bending stresses which might be produced by the thrust forces concentrated in the bearings. From the lower journal 9 the load is transmitted to the lower section 1 and the adjoining sections 2 and 3, all these sections being securely embedded into the foundation which will finally take up the load.

From the upper journal 10 the load is transmitted to the housing section 6 and from there to the supporting segment 19 which is securely held on the foundation.

The modified construction shown in Fig. 5 comprises a valve housing 21 which is substantially made of rolled plate steel and embraced by a stiffening ring 22. The wicket shaft 23 is supported by bearings 24 which are mounted on the concrete foundation 25 and take up the entire load imposed upon the wicket. As a result the valve housing 21 and the adjacent penstock which is indicated by 26 are relieved from the axial thrust forces of the wicket shaft, and they can therefore be made of a relatively light construction.

It should be understood that it is not intended to limit the invention to the exact details of construction herein shown and described, for various modifications within the scope of the claims may occur to persons skilled in the art.

It is claimed and desired to secure by Letters Patent:

1. In combination, a butterfly valve housing circumferentially divided into sections, a foundation for said housing, part of said housing sections being embedded in said foundation, and means adapted to take up thrust forces acting in the direction of the longitudinal axis of said housing upon a section of the latter not embedded in said foundation, said means comprising a supporting element engaging a portion of said foundation disposed to face said non-embedded housing section substantially in the direction of the longitudinal axis of said housing.

2. In combination, a butterfly valve housing circumferentially divided into sections, a wicket shaft, bearings supporting said shaft, a foundation for said housing, one of said bearings being associated with a section of said housing embedded in said foundation, and a supporting member secured to said foundation and bearing against a housing section not embedded in said foundation and carrying another of said bearings.

3. In combination, a butterfly valve housing, a wicket shaft extending through said housing, a foundation for said housing, a journal bearing for said wicket shaft, and supporting means for said journal bearing adapted to take up thrust forces acting upon said wicket shaft in the direction of the longitudinal axis of said housing, said means including a portion of said foundation disposed in substantially the same circumferential relation to said housing as said journal bearing, and a thrust transmitting structure disposed between said foundation portion and said wicket shaft at one side of the latter.

4. In combination, a butterfly valve housing, a wicket shaft extending through said housing, a foundation for said housing, a journal bearing for said wicket shaft, and supporting means for said journal bearing adapted to take up thrust forces acting upon said wicket shaft in the direction of the longitudinal axis of said housing, said means including a portion of said foundation disposed in substantially the same circumferential relation to said housing as said journal bearing, a mounting surface on said foundation portion extending in a plane substantially at right angles to the longitudinal axis of said housing, and a thrust transmitting structure disposed between said mounting surface and said wicket shaft at one side of the latter.

5. In combination, a butterfly valve housing, a wicket shaft extending through said housing, a foundation for said housing, a journal bearing for said wicket shaft, and supporting means for said journal bearing adapted to take up thrust forces acting upon said wicket shaft in the direction of the longitudinal axis of said housing, said means including a portion of said foundation disposed in substantially the same circumferential relation to said housing as said journal bearing, a thrust transmitting member mounted on said foundation portion, and a thrust transmitting structure detachably secured to said thrust transmitting member and connected with said journal bearing.

6. In combination, a butterfly valve housing, circumferential connecting means associated with opposite ends of said housing and an adjacent pipe line, a wicket shaft extending through said housing, a foundation adapted to support said housing and said pipe line, a journal bearing for said wicket shaft, and supporting means for said journal bearing adapted to take up thrust forces acting upon said wicket shaft in the direction of the longitudinal axis of said housing, said supporting means including, a portion of said foundation disposed in substantially the same circumferential relation to said housing as said journal bearing, said foundation portion having a mounting surface substantially at right angles to the longitudinal axis of said housing and in axially spaced relation to said circumferential connecting means so as to leave said housing unobstructed, and a thrust transmitting structure associated with said journal bearing and abutting against said mounting surface of said foundation portion.

7. In combination, a butterfly valve housing, a foundation therefor, a journal bearing for a wicket shaft mounted in said housing, and means adapted to take up thrust forces acting upon said journal bearing in the direction of the longitudinal axis of said housing, said means including a portion of said foundation disposed in substantially the same circumferential relation to said housing as said journal bearing, a portion of said housing supporting said bearing against said thrust forces, and means associated with said housing portion and said foundation portion at one side of said journal bearing for transmitting said thrust forces from said housing portion upon said foundation portion.

8. In combination, a butterfly valve housing, circumferential connecting means associated with opposite ends of said housing and an adjacent pipe line, a journal bearing for a wicket shaft mounted in said housing, a foundation adapted to support said housing and said pipe line, and means adapted to take up thrust forces acting upon said journal bearing in the direction of the longitudinal axis of said housing, said means including, a portion of said foundation disposed in substantially the same circumferential relation to said housing as said journal bearing, a thrust transmitting member mounted on said foundation portion and having a surface substantially at right angles to the longitudinal axis of said housing and in axially spaced relation to said circumferential connecting means so as to leave said housing unobstructed, and a portion of said housing supporting said journal bearing against said thrust forces, said housing portion abutting against said surface of said thrust transmitting member.

FRANZ SCHMIDT.